Figure 1:
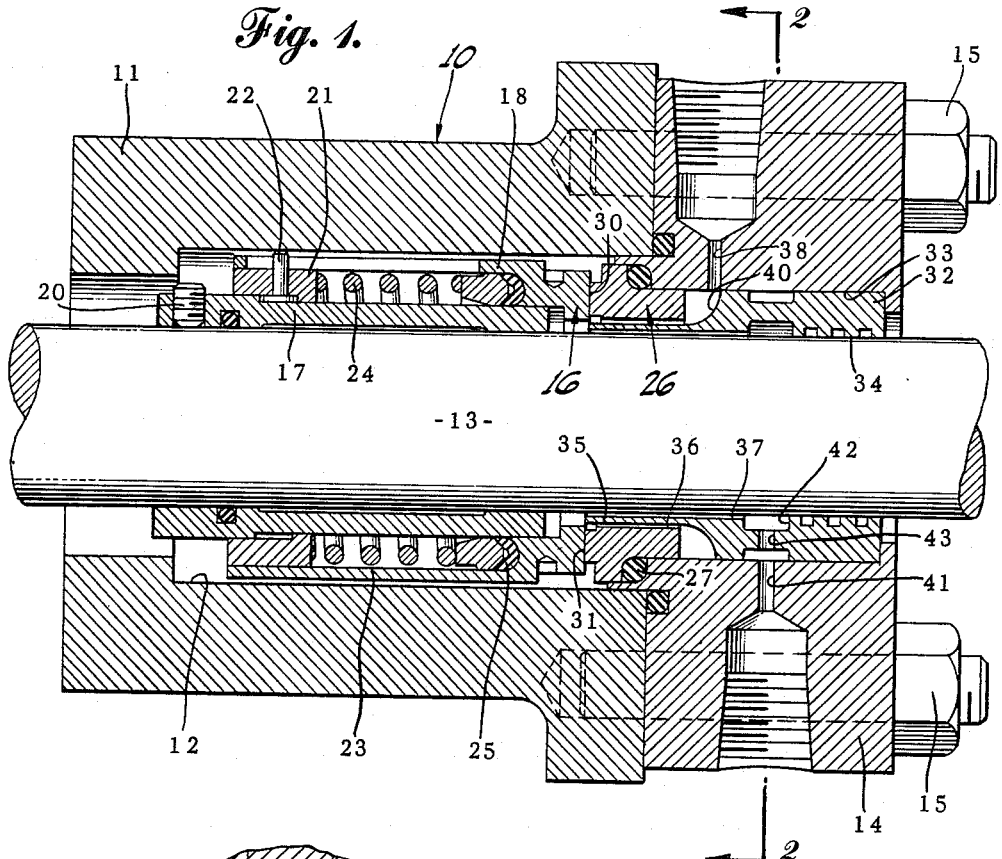

Nov. 16, 1965     R. L. GRACE     3,218,085

MECHANICAL SEAL ASSEMBLY WITH ANTI-COKING DEVICE

Filed March 1, 1962

RONALD L. GRACE
Inventor by Joseph R. Dwyer
Attorney

3,218,085
MECHANICAL SEAL ASSEMBLY WITH ANTI-COKING DEVICE
Ronald L. Grace, Downey, Calif., assignor to Borg-Warner Corporation, Chicago, Ill., a corporation of Illinois
Filed Mar. 1, 1962, Ser. No. 176,634
4 Claims. (Cl. 277—59)

The present invention relates to mechanical seals for sealing a rotatable shaft in a housing or the like within which it rotates to prevent the escape of fluid under pressure from the housing, and relates particularly to improved mechanical seals incorporating means for preventing coking which would heretofore cause malfunctioning of these seals.

Mechanical or rotary seals usually comprise parts, such as a ring, which is held stationary with respect to the housing and parts, such as another ring, fixed for rotation on and with the shaft. Each sealing part, sometimes called sealing elements or means, may comprise one or more rings, and each sealing part is provided with a face which opposes a face of another sealing means and arranged so that in response to either fluid pressure or spring pressure, or both, there is a sealing relationship between the opposed faces to form a seal to prevent leakage along the shaft. This sealing relationship, however, does not mean that the opposing faces are in direct contacting relationship with each other, but that a small lubricating film of fluid is permitted between these faces to prevent (in the case of metal rings) direct metal-to-metal contact therebetween. This lubricating film is usually made up of the fluid being sealed and reduces wear and/or seizure of the sealing faces; however, the inevitable result of having this lubricating film between the sealing faces is that a small increment of the fluid being sealed leaks past the sealing faces. As a matter of fact, this small leakage of fluid past the sealing faces is necessary to the proper operation of mechanical seals and such seals are designed to reduce this leakage to a minimum yet not prevent it entirely during normal operation of the seal so that a film of fluid is maintained for lubricating and its cooling effect on its opposed seal faces. Of course, notwithstanding the lubricating and cooling abilities of this film, there is a certain amount of wear on the seal faces and the mechanical seals are designed to, and will compensate, i.e., "take up" for wear during their operation.

However, when the fluid being sealed is crude oil, sulphur, or any other product that will solidify on contact with the atmosphere, or upon a reduction of temperature or pressure, there is a tendency of the mechanical seals to malfunction. This malfunctioning is caused by a product build-up, which is called "coking," on one or both of the sealing parts, though usually on the stationary sealing parts, which product build-up causes uneven wear on these sealing faces by not allowing faces to flex to compensate for misalignments and/or prevents the mechanical seal from taking up for wear by not allowing the two faces to move toward one another and/or by causing the seal faces to be separated from one another too much and with such a force that it cannot be overcome by the spring and fluid pressure. The heretofore-referred-to term "coking" is intended to include this phenomenon of solidification of fluid upon contact with the atmosphere or upon a reduction of temperature or pressure and it is the prevention of this coking and consequent malfunctioning of mechanical seals that the present invention pertains.

Accordingly, a present object of this invention is the provision of mechanical seals with means for preventing coking. Briefly, this invention comprises means for directing a second fluid and/or for heating the seal faces of sealing parts on the low pressure side thereof to prevent the solidification of any fluid that has leaked past these sealing means. In the embodiment disclosed, this comprises a deflector which directs steam or solvent toward the sealing means. This deflector is provided with a means for receiving the steam or solvent and returning it to its origin.

Acordingly, a more specific object of this invention is to provide a mechanical seal with means for heating or for directing a solvent toward seal faces for preventing coking on the low pressure side of the sealing means.

Figure 2:
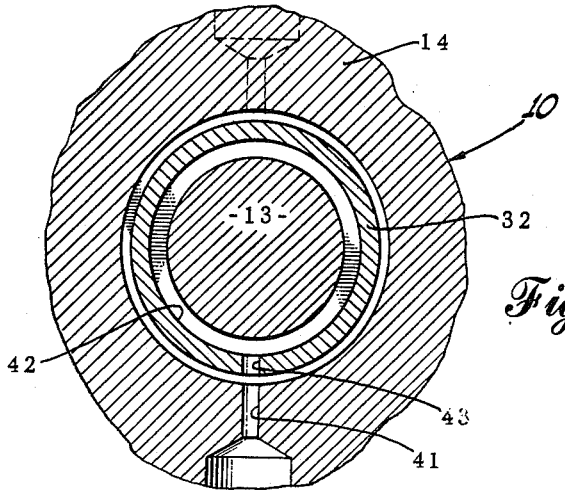

These and other objects of this invention will become apparent from the following description when taken in connection with the acompanying drawings in which:

FIGURE 1 is a longitudinal section view of mechanical seals constructed in accordance with the teachings of this invention illustrating to advantage the deflector which directs solvent or steam towards the seal faces; and FIGURE 2 is a fragmentary cross-sectional view taken along 2—2 of FIGURE 1 and looking in the direction of the arrows.

Turning now to the drawings, it can be seen that there is illustrated therein a mechanical or rotary seal, indicated in its entirety as 10 and comprising a housing 11 formed of part of another housing (not shown) in which fluid under pressure is being pumped having an inner bore 12 in which is disposed a rotatable shaft 13 in spaced relationship therewith.

The housing 11 has a flange 14 suitably attached thereto as by bolt means 15.

A rotatable sealing means 16 is suitably attached to shaft 13 for rotation therewith. The attaching means in this specifically illustrated embodiment comprises a sleeve 17 which fits over the shaft 13 and over which a cup-like spring holder 18 is telescoped. Sleeve 17 is affixed to the shaft by threaded pins such as 20 and spring holder 18 is fixed for rotation with sleeve 17 by means of a collar 21 affixed to sleeve 17 and in which are fitted pins 22 which extend radially outwardly through longitudinal slots 23 in the spring holder. The sleeve 17 provides a means for adjustably fitting the spring holder to the shaft to accommodate variations in the size of the spring holder and the shaft in accordance with good engineering practice. The spring holder is subject to the action of the helical spring 24 which encompasses the sleeve 17 and urges the cup-like seal 25 and the sealing means 16 towards a stationary sealing means 26 in the conventional manner. Slots 23 permit limited axial movement of the sealing means 16 and serve to react with the pins 22 to rotate the sealing means with the shaft.

The non-rotatable or stationary sealing means 26 is held in the housing 11 against rotation in any suitable manner and in fluid-tight sealing engagement with the flange 14 by O-ring seals 27.

It is to be understood that the means for attaching the rotating sealing means to the shaft and the means for attaching the non-rotating sealing means to the housing may vary, such means as disclosed herein being one practical embodiment of such means as illustrative of attaching means in its broadest sense.

From the above description, it can be seen that fluid under pressure from the remainder of the housing, viz., a pump housing or the like is permitted to flow into bore 12 but is prevented from leaking along the shaft by sealing means 16 and 26. Sealing means 16 has a radial face 30 and sealing means 26 has a radial face 31 which opposes face 30 to form sealing faces.

An previously mentioned, the use of rotary seals has been dependent upon the lubricating and cooling ability to a large extent of the fluid being sealed. The rotating and non-rotating means, being usually of different material such as a hard metal like Stellite, on the one hand, or carbon or soft metal like bronze on the other, will wear quite rapidly when in contacting relationship even when the sealing faces are lapped optically flat. To prevent or reduce this wear as much as possible, some leakage of minute amounts is not only desirable but necessary for proper operation of these seals.

Thus, there will be a flow of the liquid being pumped from the high pressure side of the seal to the low pressure side and when the fluid being pumped is subject to hardening, i.e., coking because of the reduction in pressure or due to exposure to atmosphere, malfunctioning of the seals may result as aforesaid. The prevention of the latter is the primary purpose of this invention and how it is accomplished will now be described.

Turning again to the drawings, it can be seen that the mechanical seal 10 is provided with a deflector sleeve 32 which is press-fitted into a bore 33 in the flange 14 and which fits closely over the shaft 13. Deflector sleeve 32 is provided with a seal means for the shaft which in the embodiment illustrated is a labyrinth seal 34 for a purpose later to be described. The deflector sleeve 32 is also provided with a relatively thin extension or deflector plate 35 which extends or telescopes within the inner periphery of the stationary seal 27 to a distance where the two seal faces 30 and 31 cooperate; sealing part 26 being formed to accommodate the extension on plate 35 and provide a passage 36 between the sealing part and the radially outer side of the plate. The deflector plate 35 is also formed with a large enough bore to provide a return passage 37 between the plate and the shaft 13 or shaft sleeve if so extended.

With the deflector sleeve so disposed, fluid, such as steam, or any solvent or other fluid may be introduced into a bore 38 in the flange and is caused to flow or be deflected toward the end of the deflector plate by the curved portion 40 into passage 36 so that fluid leaking past the sealing faces 30 and 31 are under the influence thereof. Such fluid is then returned to its source by flowing back along the shaft or shaft sleeve if so extended through passage 37 and thence out the radial passage 41 in the flange 14. Deflector sleeve 32 is also provided with a collector space 42 and a passage 43 to communicate the collector space 42 with the passage 40. Labyrinth seal 34 prevents leakage of the second fluid out past the collector space.

Thus, it can be seen that the fluid leaking past the sealing faces will not be subject to product build-up due to the influence of the second fluid and the function of the deflector sleeve so that malfunctioning of the mechanical seal due this phenomena is prevented.

While the various parts herein may have been described as upper and lower or in a right or left position, such description refers only to the relative position of the parts as shown in the drawings and is not intended to be a limitation of the invention; it being understood that the appended claims should be construed as broadly as the prior art will permit.

I claim:

1. A mechanical seal assembly adapted to provide a fluid seal between a housing wall and a rotatable shaft extending therethrough comprising a stationary seal ring secured to the housing in surrounding relation to the shaft and including an inner diameter larger than the diameter of the shaft to form an annular space therebetween, a second ring secured to the shaft for rotation therewith and axial movement therealong, each of said rings including a generally radially extending surface in rotational sliding sealing contact with the surface of said other of said rings, a spring urging said rotatable ring into said sealing sliding contact with said stationary ring, a sleeve surrounding said shaft for directing a flowing stream of secondary fluid into proximity with said sliding surfaces at a location separated from the sealed fluid by the seal formed between said rings along said radially directed contacting surfaces so as to prevent malfunction of the seal assembly caused by accumulation of sealed fluid escaping across said seal surfaces, said sleeve including; an integrally formed generally cylindrical deflector plate extending intermediate the shaft and said inner diameter of said stationary ring dividing the annular space therebetween into a pair of concentrically disposed annular flow passageways in communication with the source of secondary fluid adapted to direct the fluid to and carry it away from said location of sealing contact of said rings, an integrally formed relief defining a collector chamber for the secondary fluid in communication with one of said annular passageways, and an integrally formed seal portion surrounding the shaft adapted to prevent the escape of secondary fluid from said assembly between the shaft and said sleeve.

2. A mechanical seal assembly adapted to provide a fluid seal between a housing wall and a rotatable shaft extending therethrough comprising a stationary seal ring secured to the housing in surrounding relation to the shaft and including an inner diameter larger than the diameter of the shaft to form an annular space therebetween, a second ring secured to the shaft for rotation therewith and axial movement therealong, each of said rings including a generally radially extending surface in rotational sliding sealing contact with the surface of said other of said rings, a spring urging said rotatable ring into said sealing sliding contact with said stationary ring, a sleeve including a generally cylindrical outer diameter surrounding the shaft for directing a flowing stream of secondary fluid into proximity with said sliding surfaces at a location separated from the sealed fluid by the seal formed between said ring along said radially directed contacting surfaces so as to prevent malfunction of the seal assembly caused by accumulation of sealed fluid escaping across said seal surfaces, said sleeve including; an integrally formed generally cylindrical deflector plate extending intermediate the shaft and said inner diameter of said stationary ring dividing the annular space therebetween into a pair of concentrically disposed annular flow passageways in communication with the source of secondary fluid adapted to direct the fluid to and carry it away from said location of sealing contact of said rings, an integrally formed relief defining a collector chamber for the secondary fluid in communication with one of said annular passageways, an integrally formed seal portion surrounding the shaft adapted to prevent the escape of secondary fluid from said assembly between said shaft and said sleeve, and said assembly further including a flange secured to said housing wall supporting said stationary seal ring in concentric relation to said shaft, including a generally cylindrical bore portion having a diameter approximately equal to the outer diameter of the sleeve within which said sleeve is retained in concentric relation to said shaft, said flange further including a radially directed portion adjacent one end of said bore portion retaining said sleeve from axial movement in a direction away from said sealing rings.

3. A mechanical seal assembly adapted to provide a fluid seal between a housing wall and a rotatable shaft extending therethrough comprising a stationary seal ring secured to the housing in surrounding relation to the shaft and including an inner diameter larger than the diameter of the shaft to form an annular space therebetween, a second ring secured to the shaft for rotation therewith and axial movement therealong, each of said rings including a generally radially extending surface in rotational sliding sealing contact with the surface of said other of said rings, a spring urging said rotatable ring into said sealing sliding contact with said stationary ring, a sleeve including a generally cylindrical outer diameter surrounding the shaft for directing a flowing stream of secondary fluid into proximity with said sliding surfaces at a location separated from the sealed fluid by the seal formed between said rings along said radially directed contacting surfaces so as to prevent malfunction of the seal assembly caused by accumulation of sealed fluid escaping across said seal surfaces, said sleeve including; an integrally formed generally cylindrical deflector plate extending intermediate the shaft and said inner diameter of said stationary ring dividing the annular space therebetween into a pair of concentrically disposed annular flow passageways in communication with the source of secondary fluid adapted to direct the fluid to and carry it away from said location of sealing contact of said rings, an integrally formed relief defining a collector chamber for the secondary fluid in communication with one of said annular passageways, an integrally formed seal portion surrounding the shaft adapted to prevent the escape of secondary fluid from said assembly between the shaft and said sleeve, said assembly further including a flange secured to the housing wall supporting said stationary seal ring in concentric relation to the shaft; portions of said flange, said sleeve, and said stationary seal coacting to define a collector ring passage for said secondary fluid in communication with the other of said annular flow passages, said chamber defining portion of said sleeve including an arcuately formed surface surrounding the shaft adapted to alter the direction of flow of said secondary fluid from a path generally radial with respect to the shaft to a path generally axial with respect thereto.

4. A mechanical seal assembly adapted to provide a fluid seal between a housing wall and a rotatable shaft extending therethrough comprising a stationary seal ring secured to the housing in surrounding relation to the shaft and including an inner diameter larger than the diameter of the shaft to form an annular space therebetween, a second ring secured to said shaft for rotation therewith and axial movement therealong, each of said rings including a generally radially extending surface in rotational sliding sealing contact with the surface of said other of said rings, a spring urging said rotatable ring into said sealing sliding contact with said stationary ring, a sleeve surrounding said shaft for directing a flowing stream of secondary fluid into proximity with said sliding surfaces at a location separated from the sealed fluid by the seal formed between said rings along said radially directed contacting surfaces so as to prevent malfunction of the seal assembly caused by accumulation of sealed fluid escaping across said seal surfaces, said sleeve including; an integrally formed generally cylindrical deflector plate at one end thereof extending intermediate the shaft and said inner diameter of said stationary ring dividing the annular space therebetween into a pair of concentrically disposed annular flow passageways in communication with the source of secondary fluid adapted to direct the fluid to and carry it away from said location of sealing contact of said rings, said deflector plate terminating approximately at the axial position of said contacting sealing surfaces whereby said flowing secondary fluid passes from one of said annular flow passageways to the other thereof at said axial position, said sleeve further including an integrally formed relief defining a collector chamber for the secondary fluid in communication with one of said annular passageways, and an integrally formed seal portion on the other end thereof surrounding said shaft adapted to prevent the escape of secondary fluid from said assembly between the shaft and said sleeve.

References Cited by the Examiner

UNITED STATES PATENTS

| 1,795,932 | 3/1931 | Cornell | 277—68 |
| 2,949,321 | 8/1960 | Tracy | 277—68 |
| 2,992,842 | 7/1961 | Shevchenke et al. | 277—22 XR |

FOREIGN PATENTS 1,196,013  5/1959  France.

OTHER REFERENCES

Norton, R. D.: Mechanical Seals for Handling Abrasive Liquids, in Chemical Engineering, pp. 199–210, September 1956. (Copy in Group 360, 277–93.)

LEWIS J. LENNY, *Primary Examiner.*

EDWARD V. BENHAM, *Examiner.*